P. Crosby,
Resawing Machine.
Nº 8,022.
Patented Apr. 8, 1851.
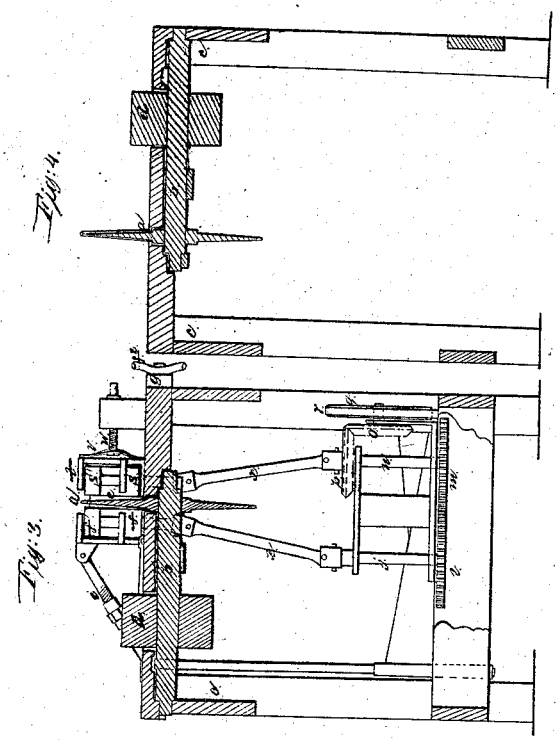
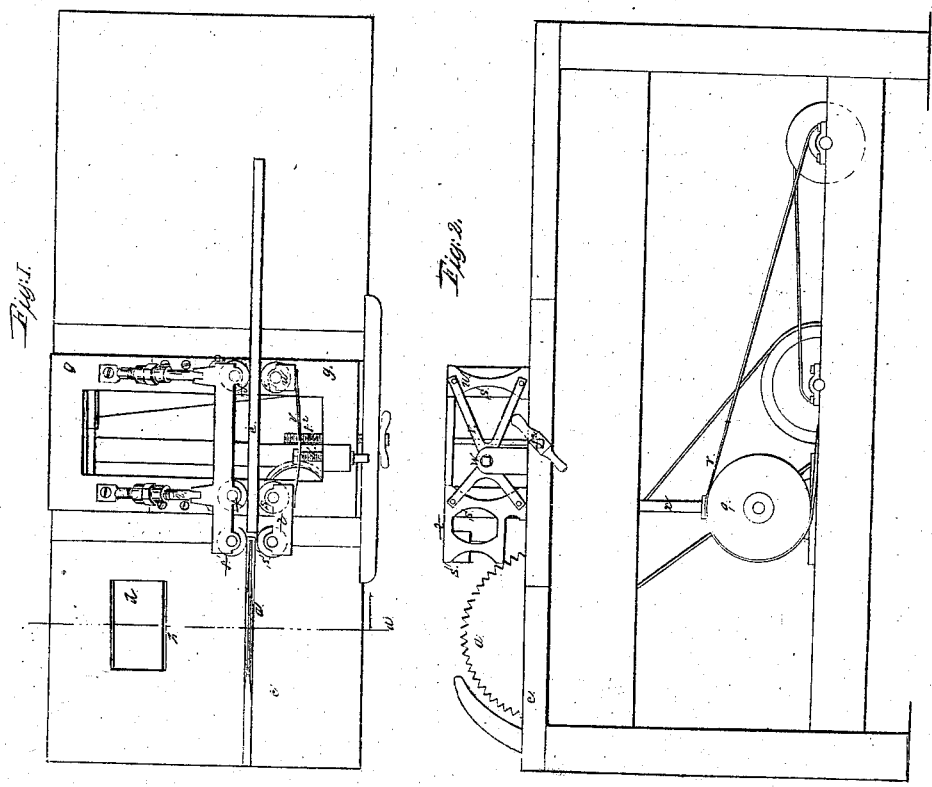

UNITED STATES PATENT OFFICE.

PEARSON CROSBY, OF FREDONIA, NEW YORK.

SAWING-MACHINE.

Specification of Letters Patent No. 8,022, dated April 8, 1851.

*To all whom it may concern:*

Be it known that I, PEARSON CROSBY, of Fredonia, New York, have invented certain new and useful Improvements in Sawmills for Slitting or Resawing Plank and other Lumber with Circular Saws, and that the following is a full, clear, and exact description of the same, reference being had to the accompanying drawings, making part of this specification, in which—

Figure 1 is a plan of my improved sawmill, Fig. 2 a side elevation, and Figs. 3 and 4 cross vertical sections taken at the line A, a, of Fig. 1, and looking in opposite directions.

The same letters indicate like parts in all the figures.

The use of the circular saw which presents in some respects important advantages over the reciprocating saw has not been heretofore successfully applied to resawing or slitting planks and other lumber, except very narrow lumber, for the reason that when such saw is made of the requisite diameter, it will buckle, and to prevent this, it must be so thick as to be wasteful of the lumber and of the power applied to drive it. This difficulty has been overcome for the purpose of sawing veneers by making the saw of a convex form on that face of it over which the veneer passes as it is cut from the log; but this method cannot be used for what is called resawing or slitting planks or lumber, for the reason that, from the thickness of the two parts they are too stiff and rigid to pass over the thick part of the saw, when made all on one face, and even if the additional thickness were made equally on both faces, the binding on the saw-plate would be so great as to present a serious resistance to its rotation.

The object of my invention is so to construct and apply the circular saw to the slitting or resawing of planks or lumber as to avoid all the objections above pointed out, and to this end.

The nature of my invention consists in making a circular saw with both faces convex or swelled, so that it shall present a thin edge when the teeth are cut, to avoid waste of the lumber and reduce the resistance in cutting, and be gradually thicker toward the shaft to give it the requisite thickness to prevent buckling and insure a steady motion at the periphery; when this is combined with a fixed beveled gage placed near the periphery of the saw on that side of the shaft opposite to where the lumber is presented to the teeth, so that the said gage shall separate or spread the two parts of the plank as they are being cut and prevent them from binding against the faces of the saw.

In the accompanying drawings $a$ represents a circular saw mounted on an appropriate shaft $b$, which runs in boxes in the usual manner in a frame $c$ of any proper form. The shaft is provided with a pulley $d$ as usual to receive a belt from any first mover. This saw is made convex on both faces so as to be of considerable thickness toward the shaft, and thin at and near the periphery. Back of the saw and firmly attached to the frame is a metal guide, which in form is the segment of such a circle, that when placed near the periphery of the saw, it shall be concentric therewith. The edge of it next the saw is sharp or nearly so, and it is gradually thicker toward the back, for the purpose of so spreading the plank as to prevent binding or rubbing against the faces of the saw.

The plank $e$ is presented to the edge of the saw by two sets of rollers, the one set $f, f, f$, constituting the guide or bed rollers. They are mounted in a frame $g$, which can slide laterally in the main frame, and be adjusted to determine the thickness of one part of the plank to be slit, by means of a set screw $f^2$, and this frame $g$ is made in two parts, the vertical part being connected with the horizontal part by a hinge joint of any kind at bottom, and the top is connected by adjusting jointed screws $i\ i$ so that the axes of the rollers may be set to any desired angle with the plane of the saw to adapt the machine to the sawing of plank thicker at one edge than the other. One of these rollers has its lower journal connected with a vertical shaft $j$, in the lower part of the frame by a rod $k$, and two universal joints so that the roller may be changed in position and still receive motion from the said shaft $j$, which shaft has a spur wheel $l$ which engages the cogs of another spur wheel $m$ of equal diameter on another shaft $n$ which carries a bevel wheel $p$ engaging a corresponding bevel wheel $(o)$ on the shaft of a band wheel $q$, over which passes a band $r$ from a pulley on the end of one of a pair of conical rollers which receive motion by a band from the shaft of the saw. In this way the feed motion for the plank is obtained, and the conical rollers admit of varying the feed in the usual manner.

By the side of the rollers just described is the other set $s$, $s$, $s'$, mounted, two in one frame $t$, and the third in another frame $u$, and the two frames are connected by a spring $v$, with an adjusting screw $w$ by means of which the two sets of rollers can be brought nearer together or farther apart to suit the thickness of timber intended to be slit or resawed,—the spring giving the requisite play to the rollers to enable them to adapt themselves to the varying thickness of the plank as it passes through, while at the same time its tensive force should be sufficient to bend out of the plank any warps, and insure its presentation to the edge of the saw in a proper manner, so that one part of the plank when slit shall be of equal and uniform thickness. The roller $s'$ of this set is connected with the shaft $n$, by means of a rod $x$, by two universal joints, so that one of the rollers of each set taken together act as feed rollers to propel the plank toward the saw. Although this gearing may be dispensed with and the plank be fed forward by other known mechanical means, such as an endless chain. When the two geared rollers are used for the purpose of feeding the board, one or both of them should be fluted.

Having thus pointed out the nature of my invention and the manner in which I have essayed the same with success, I will state that I do not wish to limit myself to the precise mode of constructing and arranging the parts as these may be variously modified, without departing from the principle of my invention. But

What I claim as my invention and desire to secure by Letters Patent is—

Making the circular saw with both faces convex in the manner and for the purpose substantially as specified when this is combined with the guide, substantially as specified, for spreading apart the plank to prevent the binding of the saw, as specified.

PEARSON CROSBY.

Witnesses:
ROBERT W. JONES,
MASON NAYLOR.